United States Patent [19]

Masubuchi et al.

[11] Patent Number: 5,764,865
[45] Date of Patent: Jun. 9, 1998

[54] PAGE PRINTER CONTROLLER

[75] Inventors: Masaki Masubuchi; Asahiko Kikuchi; Hitomi Shimizu, all of Ibaraki, Japan

[73] Assignee: Hitachi Koki Co., Ltd., Tokyo, Japan

[21] Appl. No.: 575,020

[22] Filed: Dec. 19, 1995

[30] Foreign Application Priority Data

Dec. 22, 1994 [JP] Japan .................................. 6-320488

[51] Int. Cl.$^6$ .................................................. G06K 15/00
[52] U.S. Cl. .................................................. 395/114; 395/102
[58] Field of Search .................................. 395/114, 115, 395/116, 112, 113, 501, 502, 507, 522, 526, 293, 299, 427, 601; 358/407, 468, 444, 404, 448, 450; 370/461, 462; 382/232, 233, 234, 235; 345/202, 501, 502, 507, 522, 526, 506, 505; 711/100; 707/1

[56] References Cited

U.S. PATENT DOCUMENTS

| | | | |
|---|---|---|---|
| 4,096,572 | 6/1978 | Namimoto | 395/293 |
| 4,485,438 | 11/1984 | Myrmo et al. | 395/427 |
| 5,559,936 | 9/1996 | Poulter et al. | 395/601 |

*Primary Examiner*—Edward L. Coles, Sr.
*Assistant Examiner*—Dov Popovici
*Attorney, Agent, or Firm*—Sughrue, Mion, Zinn, Macpeak & Seas, PLLC

[57] ABSTRACT

A page printer controller includes an expanding processor for restoring compressed image data, a memory for storing the restored image data, a graphic processor for processing the image data, and a memory access arbitration circuit for concurrently operating both processors.

6 Claims, 3 Drawing Sheets

⇒ : DATA LINE
➡ : ADDRESS LINE
→ : CONTROL LINE

PAGE PRINTER CONTROLLER

BACKGROUND OF THE INVENTION

1. Field of the Invention

The invention relates to a page printer controller that has a compressed image data expanding function and a graphic function including a function of enlarging and reducing the expanded image data.

2. Description of the Related Art

FIG. 3 is a diagram showing the configuration of a page printer. In FIG. 3, reference numeral 8 denotes a control section; 9, a print data processing section; 10, a page memory; 11, a data converting section; and 12, a printer engine. Print data from a host apparatus is received by the control section 8. The control section 8 then decodes the received print data, delivers character codes and the like to the print data processing section 9, and instructs the print data processing section 9 to print. In accordance with the print instruction from the control section 8, the print data processing section 9 processes the character codes and generates the print data in a dot pattern format and stores the generated data in the page memory 10. The data converting section 11 reads the print data from the page memory 10, converts the read print data into serial dot data, and feeds the converted data to the printer engine 12.

Additionally, the page printer can print images such as pictures and photographs in addition to characters. These image data are usually sent from the host apparatus in dot pattern form. In recent years, there are some page printers that can handle image data. In these page printers, the dot pattern image data are converted into compressed image data by an algorithm so that the page printers can handle image data in compressed form. These page printers handling the compressed image data require their page printer controller expand the compressed image data received from the host apparatus so that the dot pattern image data can be restored (this processing will hereinafter be referred to as "the compressed image expanding processing").

In addition, there are some other page printers that can even execute such graphic processing as enlarging, reducing an image as well as cutting out an arbitrary region of the image with respect to the restored dot pattern image data (this processing will hereinafter be referred to as simply as "the graphic processing). Since the page printer controller must execute the compressed image expanding processing and the graphic processing before the data is stored in the page memory 10, such processings are to be executed by the print data processing section 9.

FIG. 4 shows the configuration of the compressed image expanding processing section and the graphic processing section in the conventional page printer controller. That is, FIG. 4 shows a part of the print data processing section 9 shown in FIG. 3. An expanding processor 1 receives the compressed image data from the control section 8 and restores the original image data through the expanding processing in accordance with a predetermined algorithm. The restored image data are sequentially written to an expanded image memory 3. A graphic processor 2 reads the image data restored in the expanded image memory 3, executes such processing as enlarging, reducing the image, or cutting out an arbitrary region of the image, and then stores the thus processed data in a pattern memory 4.

In the compressed image expanding processing, the conventional page printer controller takes two steps: the first step of once restoring all the compressed image data in a expanded image memory, and the second step of executing the graphic processing by activating the graphic processor after the compressed image expanding processing has been completed. For this reason, it took a relatively long time to complete the graphic processing, imposing the problem of decreasing the page printer controller's processing speed.

SUMMARY OF THE INVENTION

An object of the invention is to improve the page printer controller's processing time by increasing the controller's processing speed while concurrently operating the respective processors.

The above object can be achieved by the provision of a page printer controller having a compressed image data expanding function and a graphic function including a function of enlarging and reducing the expanded image data, said page printer controller, comprising: an expanding processor for expanding image data in a compressed data format sent from a host apparatus and restoring the expanded image data to image data in a dot pattern format; a memory for temporarily storing the image data restored in the dot pattern format by said expanding processor; a graphic processor for reading the image data in the dot pattern format in the memory and graphically processing the read image data; and a memory access arbitration circuit for concurrently operating both processors.

When the expanding processor and the graphic processor are operated concurrently, the problem that the two processors scramble to access the commonly used expanded image memory is addressed.

The memory access arbitration circuit is so designed as to mediate access to the expanded image memory between the expanding processor and the graphic processor, so that the two processors can operate concurrently in an efficient manner.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENT

Figure 1:
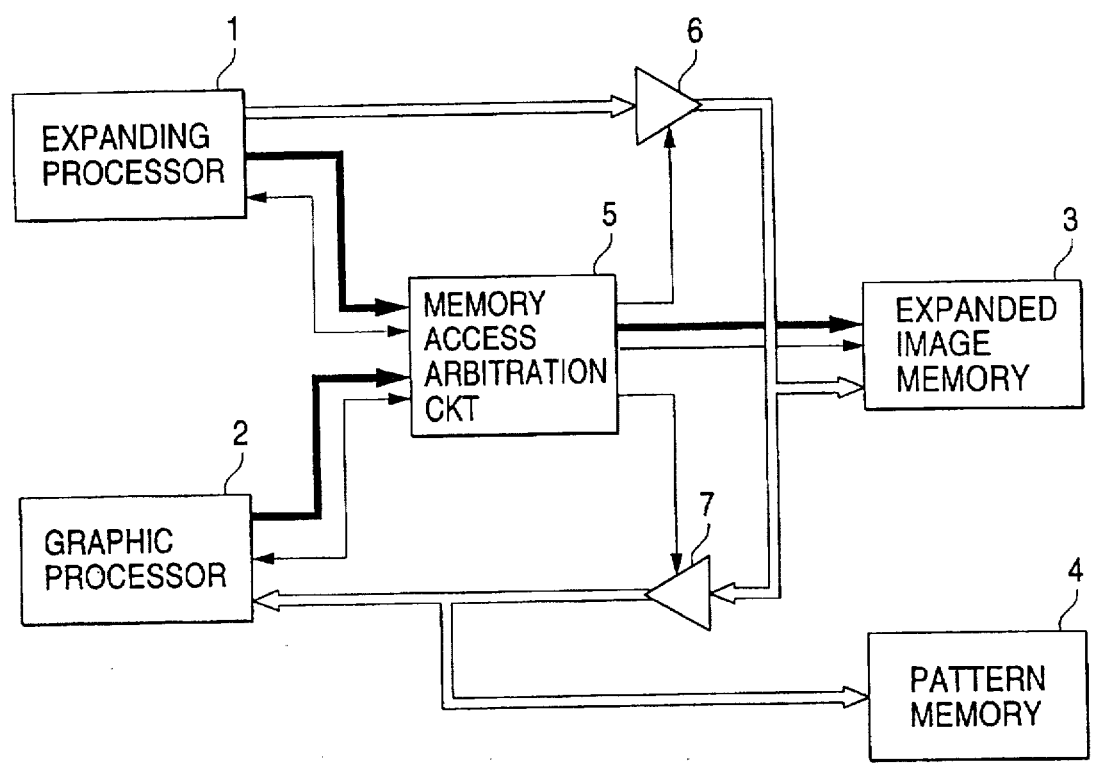
FIG. 1 is an explanatory diagram showing an embodiment of compressed image expanding processing and graphic processing in a page printer controller of the invention.

FIG. 1 shows an embodiment of the invention. An expanding processor 1 expands compressed image data and writes dot pattern image data to an expanded image memory 3 through a gate 6. On the other hand, a graphic processor 2 reads the dot pattern data in the expanded image memory 3 through a gate 7, graphically processes the dot pattern data, and writes the graphically processed data to an area in a pattern memory 4. A memory access arbitration circuit 5 is designed to permit concurrent operation of both processors (which will be described later) by arbitrating access to the expanded image memory 3 between both the expanding processor 1 and the graphic processor 2. The memory access arbitration circuit 5 receives memory address lines and memory control lines from the expanding processor 1 and the graphic processor 2, respectively, and gives out the memory address lines and the memory control lines to the expanded image memory 3. The memory access arbitration circuit 5 performs the arbitration operation by newly outputting an address signal and a control signal to the expanded image memory 3 based on an address signal and a control signal received from both processors.

In the arbitration operation, the gate 6 blocks the data outputted to the data line by the expanded processor 1 so that the writing of the data to the expanded image memory 3 by the expanding processor 1 will be temporarily prohibited when the writing of the data to the expanded image memory 3 by the expanded processor 1 contends with the reading of data from the expanded image memory 3 by the graphic processor 2. The gate 7 blocks the data outputted to the data line by the graphic processor 2 so that the data will not be applied to the expanded image memory 3 when the graphic processor 2 writes the data to the pattern memory 4.

Figure 2:
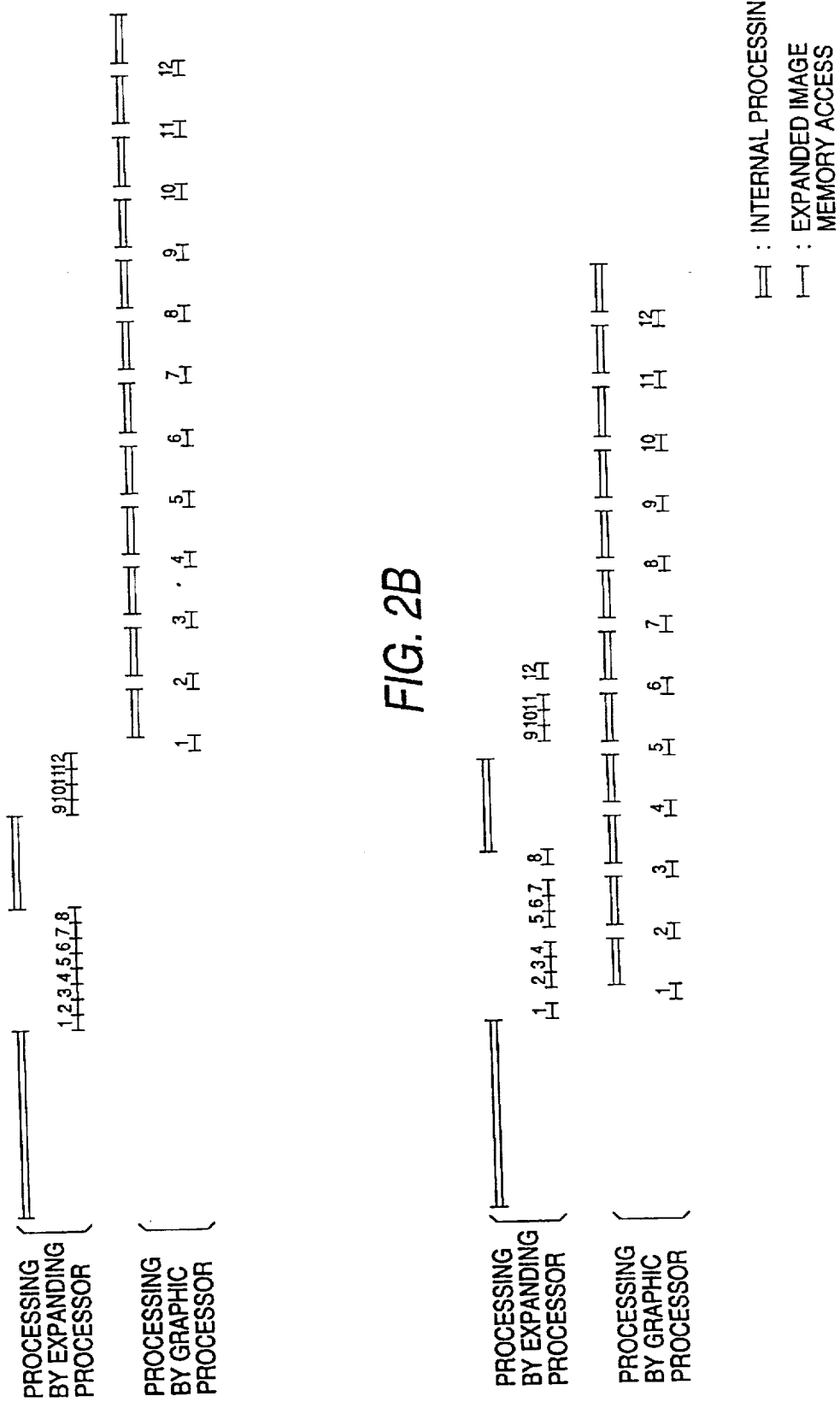
FIGS. 2A and 2B are explanatory diagrams in which processing time of the invention is compared with that of a conventional example.
Figure 3:
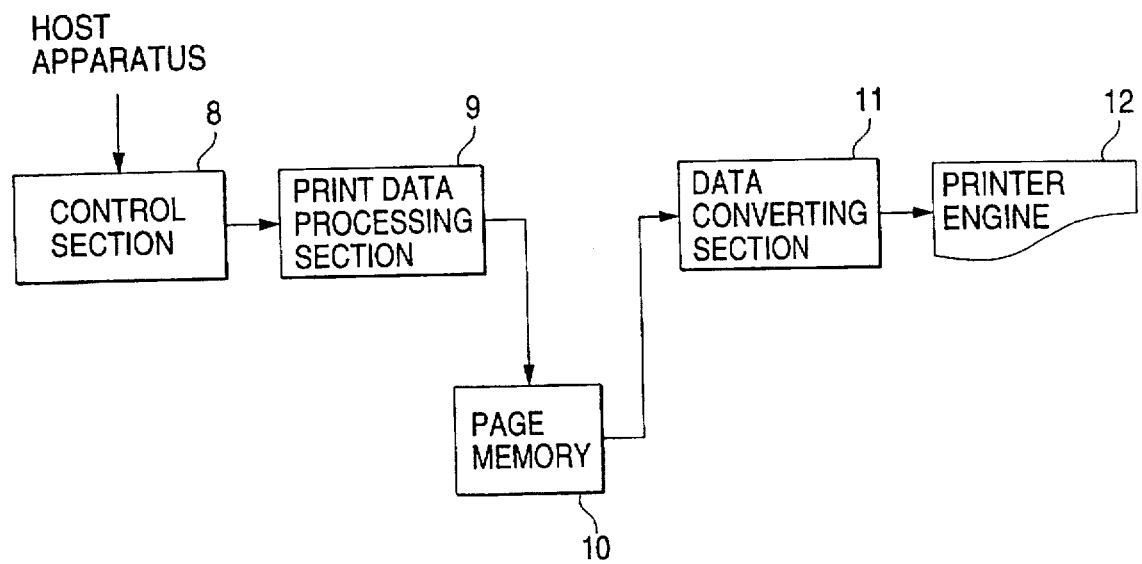
FIG. 3 is an explanatory diagram showing the configuration of the page printer controller.
Figure 4:
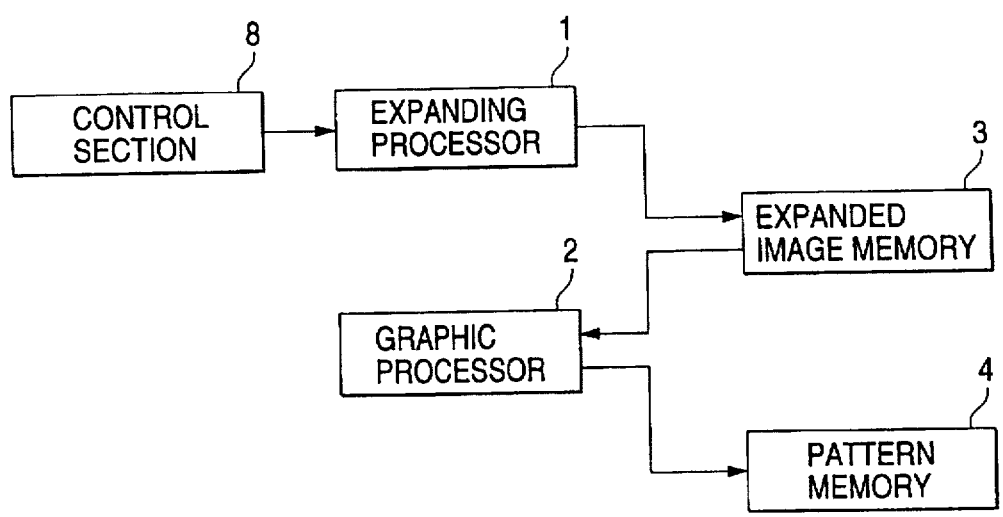
FIG. 4 is an explanatory diagram showing the conventional example.

FIGS. 2A and 2B are diagrams showing a comparison between the processing time of the conventional system and that of the embodiment of the invention. More specifically, this is an example in which 12-word image data is restored by the expanding processor and reduced by the graphic processor. The expanding processor repeats internal processing (including the compressed image data receiving time) and the processing of writing the restored image data to the expanded image memory by 8 words consecutively. The graphic processor repeats internal processing (including the writing to the pattern memory) by reading 1-word data in the expanded image memory. Since the conventional system is such that the graphic processor executes the processing after the expanding processor has restored all the 12-word data as shown in FIG. 2A, the overall processing time is simply the sum of the expanding processor's processing time and the graphic processor's processing time.

While the technique of increasing the clock frequency could be proposed as a simple means to improve the overall processing time, the technique of concurrently operating both processors is also conceivable as another effective means.

What bottlenecks the improvement of processing time through the concurrent operation of both processors is the frequency at which both processors access the commonly used memory. In a system in which both processors access the common memory at a relatively high frequency, processing time improvement through concurrent operation will not be so much as expected. However, in consideration of the fact that both processors spend much time in internal processing, leaving plenty of time remaining for accessing the expanded image memory in FIG. 2A, it is understood that the concurrent operation of both processors is most likely effective in improving the overall processing time.

It is the system shown in FIG. 2B that is adopted by this embodiment. This embodiment is characterized as implementing concurrent operation by causing the expanding processor to write expanded image data while the graphic processor is executing the internal processing, taking advantage of the fact that the graphic processing takes longer time than expanding processing in total. The concurrent operation is implemented by controlling the memory access arbitration circuit so that priority of accessing the image memory is given to the graphic processor. The concurrent operation according to this system is the same as that shown in FIG. 2A up to the first round of internal processing and 1-word writing by the expanding processor. However, the concurrent operation according to this system is distinguished from the system shown in FIG. 2A in that the graphic processor starts processing by reading the first 1-word data immediately after the expanding processor has written the 1-word data. In the concurrent operation according to the invention, the graphic processor thereafter continues processing without interruption similarly to the operation shown in FIG. 2A in which the graphic processor is operating singly, and the expanding processor writes the data to the image memory while the graphic processor is executing the internal processing. The total processing time according to this embodiment equals the sum of the expanding processor's first internal processing and 1-word data writing time and the graphic processor's processing time. If the volume of data generally processed by a laser printer controller to which the invention is applied is in the order of several kilobytes to several megabytes, then "the expanding processor's first internal processing and 1-word data writing time" becomes so short as to be negligible compared with the graphic processor's processing time. Therefore, the total processing time becomes substantially equal to the graphic processor's processing time in actually using the system of the invention. That is, the total processing time is reduced, compared with the conventional system, almost as much as the expanding processor's processing time.

The invention can improve the processing time of the page printer controller that has a compressed image data expanding function and a graphic function including a function of enlarging and reducing the expanded image data.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A page printer controller having a function of expanding compressed image data, as well as a graphic function, the graphic function including a function of enlarging and reducing the expanded image data, the page printer controller comprising:

an expanding processor for expanding image data received from a host apparatus in a compressed data format to restore the image data to expanded image data in a dot pattern format;

a memory for temporarily storing the expanded image data which has been restored to the dot pattern format by said expanding processor;

a graphic processor for reading the expanded image data in the dot pattern format from the memory and graphically processing the expanded image data read out; and a memory access arbitration circuit for facilitating concurrent operation of said expanding processor and said graphic processor.

2. The page printer controller according to claim 1, wherein said memory access arbitration circuit allows said expanding processor to write the expanded image data to said memory while said graphic processor executes internal processing.

3. A page printer controller having a function of expanding compressed image data, as well as a graphic function, the page printer controller comprising:

an expanding processor for expanding image data received from a host apparatus in a compressed data format to restore the image data to expanded image data in a dot pattern format;

a memory for temporarily storing the expanded image data which has been restored to the dot pattern format by said expanding processor;

a graphic processor for reading the expanded image data in the dot pattern format from the memory and graphically processing the expanded image data read out; and a memory access arbitration circuit for facilitating concurrent operation of said expanding processor and said graphic processor, said memory access arbitration circuit receiving first memory address signals from said expanding processor as a first input, receiving second memory address signals from said graphic processor as a second input, and producing an output memory address signal for addressing said memory, wherein said output memory address signal is selected from either said first memory address signals or said second memory address signals.

4. The page printer controller according to claim 3, wherein the graphic function of the controller includes a function of enlarging and reducing the expanded image data.

5. The page printer controller according to claim 3, further comprising:

a first gate for selectively permitting said expanded image data to pass from said expanding processor into said memory via a data bus, in accordance with a first gate signal; and a second gate for selectively permitting said expanded image data to pass from said memory to said graphic processor via said data bus, in accordance with a second gate signal.

6. The page printer controller according to claim 5, wherein said first gate signal and said second gate signal are both provided by said memory access arbitration circuit.

* * * * *